Dec. 8, 1942.   G. C. PAXTON ET AL   2,304,473
CONVEYER CONTROL
Filed Oct. 4, 1940   4 Sheets-Sheet 3
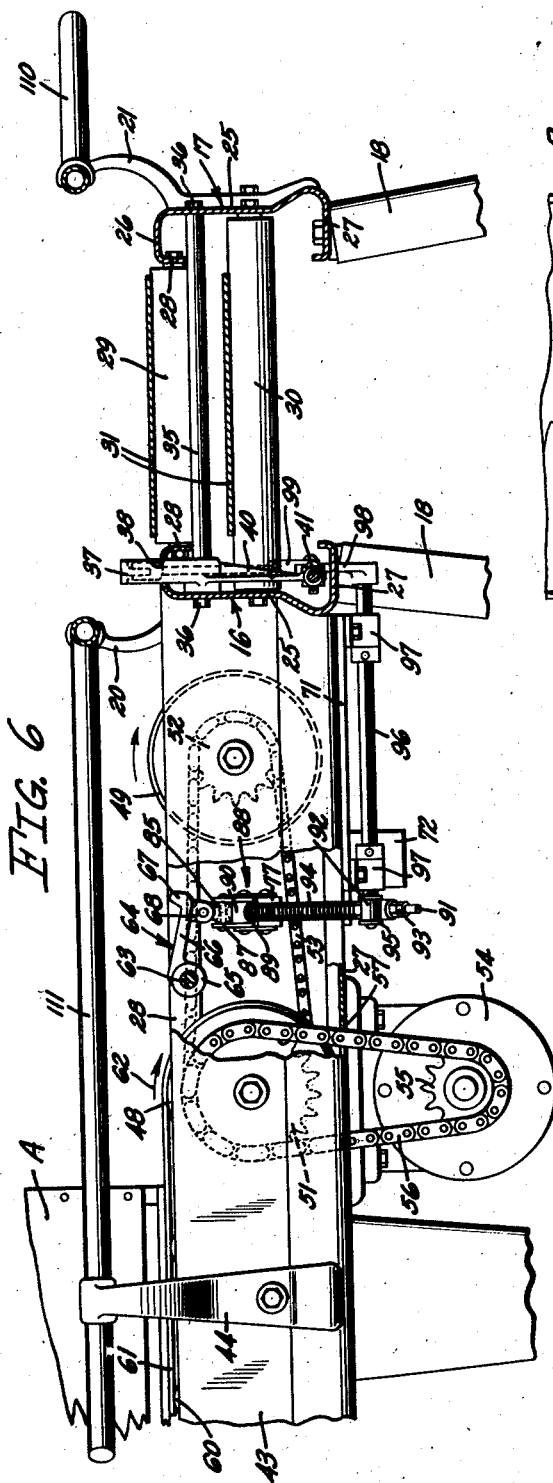
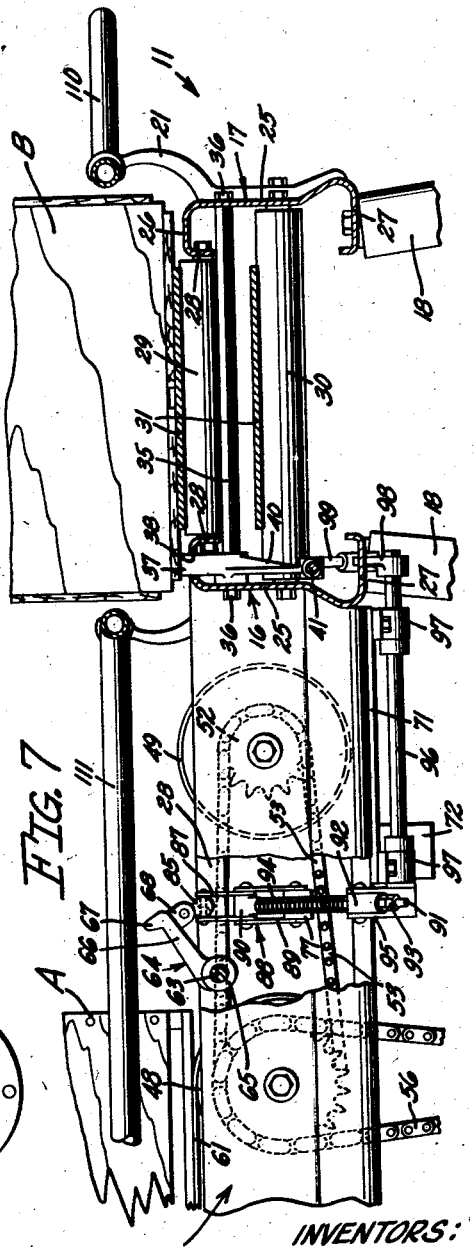
INVENTORS:
GERALD C. PAXTON
HOWARD D. PORCH
BY
ATTORNEY

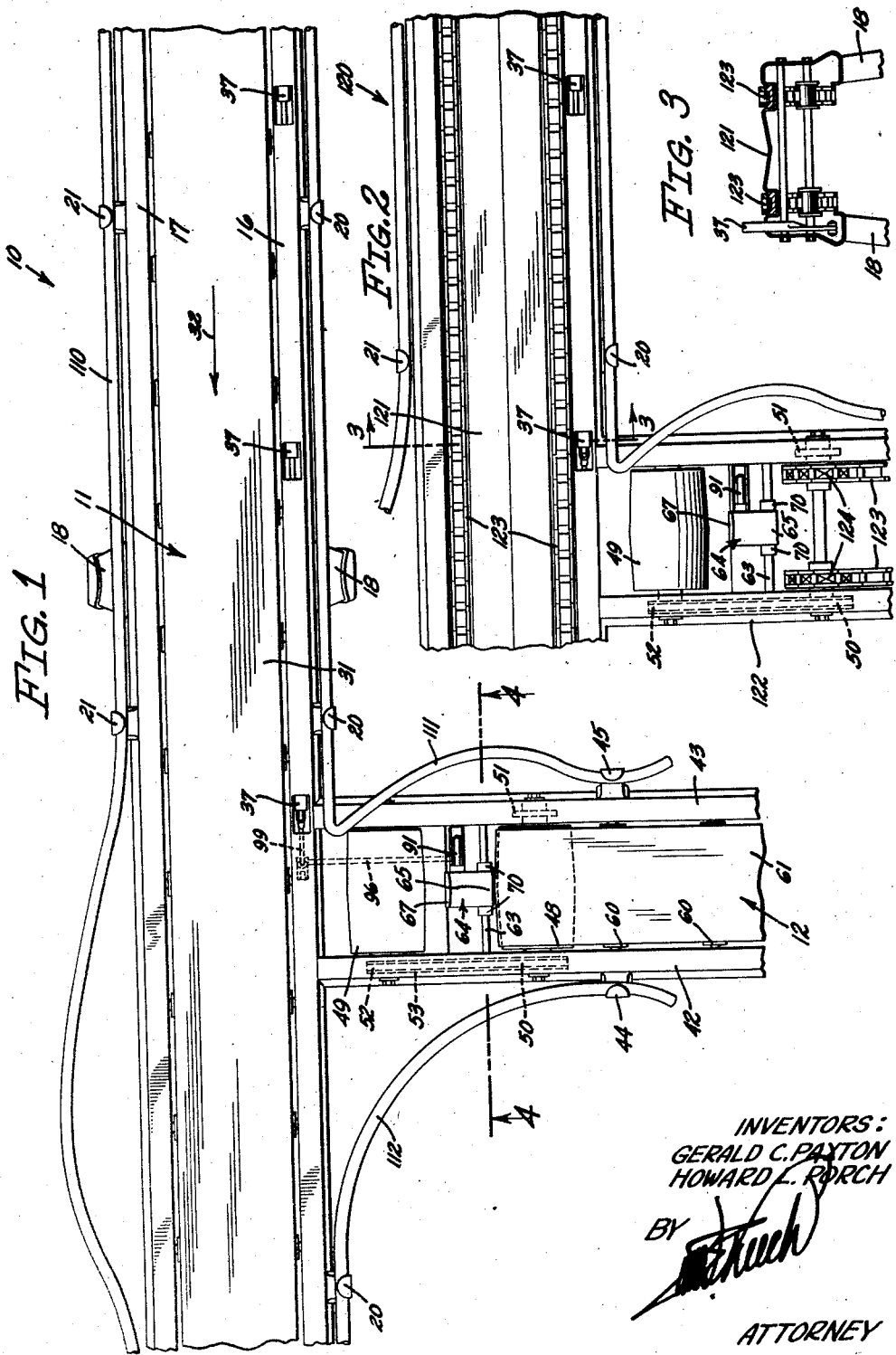

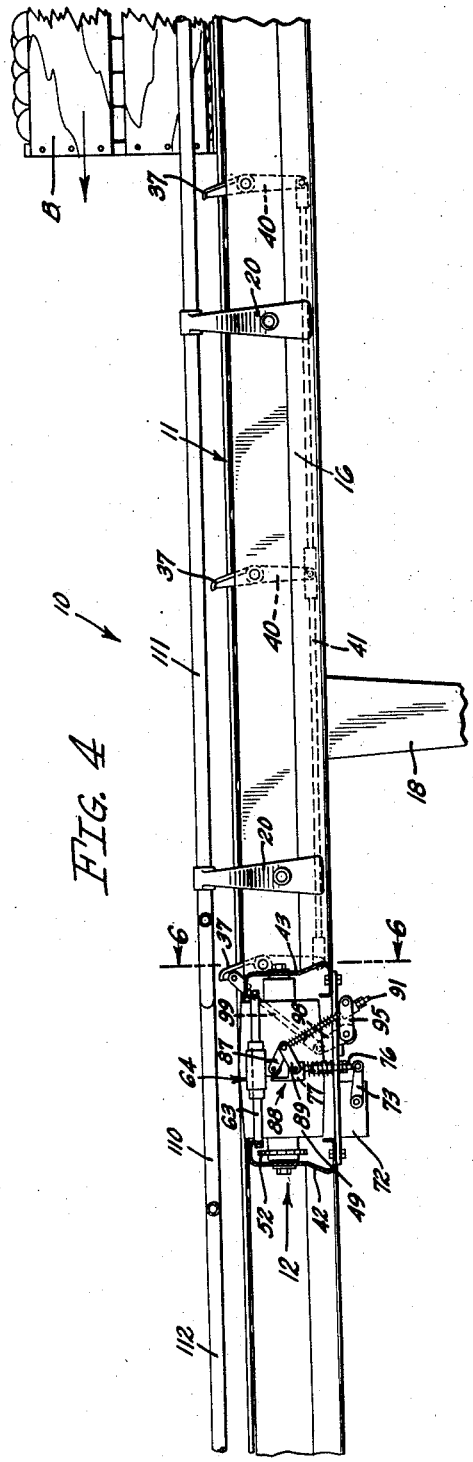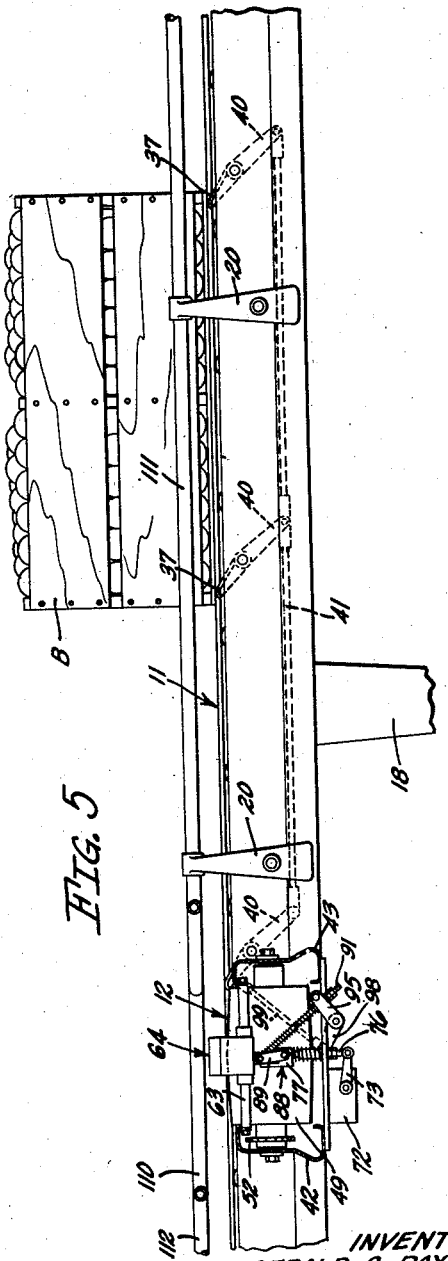

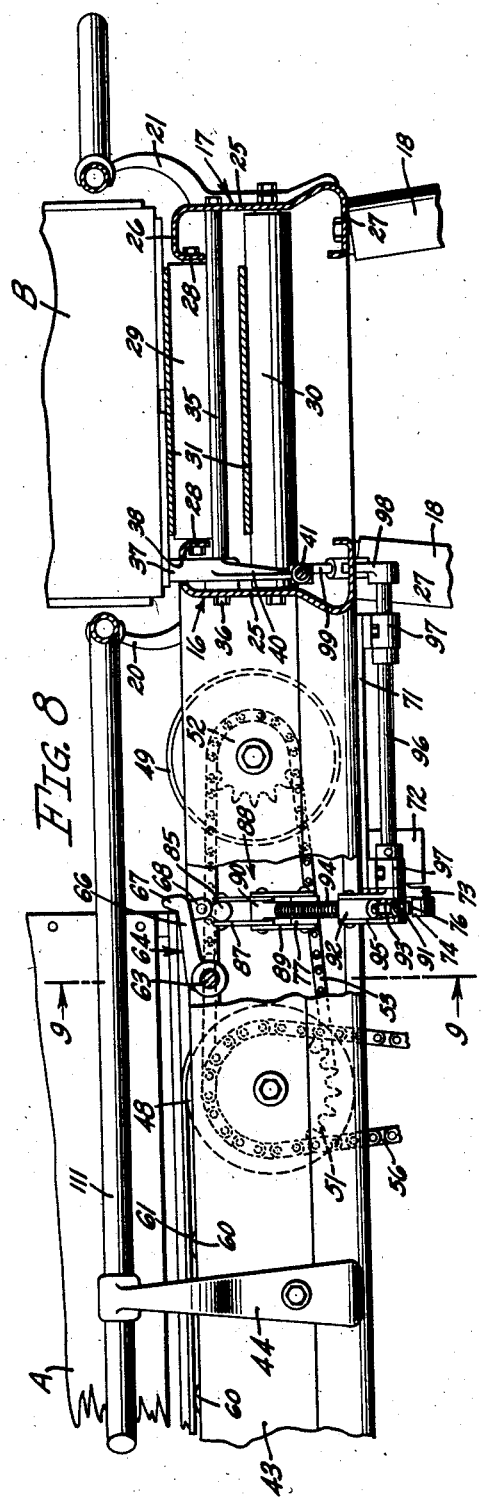
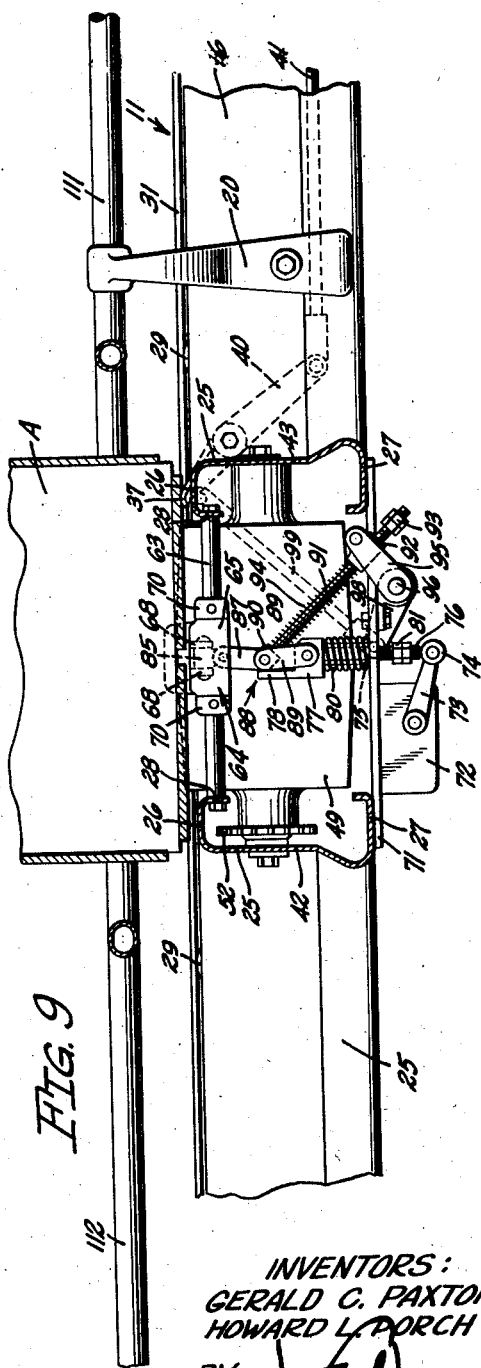

Patented Dec. 8, 1942

2,304,473

UNITED STATES PATENT OFFICE 2,304,473

CONVEYER CONTROL

Gerald C. Paxton and Howard L. Porch, Riverside, Calif., assignors to Food Machinery Corporation, San Jose, Calif., a corporation of Delaware Application October 4, 1940, Serial No. 359,764

5 Claims. (Cl. 198—21)

This invention relates to conveyer controls, and particularly to controls responsive to articles carried on the conveyer.

It is an object of this invention to provide a novel conveyer control of this type which is adaptable to control the operation of a conveyer for delivering articles onto another conveyer through an intersection between said conveyers.

It is a further object to provide such a novel conveyer control which will operate automatically to prevent the jamming of boxes in such an intersection.

It is another object of the invention to provide a conveyer control suitable for use in controlling the delivery of boxes into an intersection between two conveyers, in which the box responsive elements of the control are such that the control is suitable without alteration for use either with a belt conveyer or with a chain conveyer.

The manner of accomplishing the foregoing objects, as well as further objects and advantages, will be made manifest in the following description taken in connection with the following drawings, in which:

Fig. 1 is a plan view of a belt conveyer intersection incorporating a preferred embodiment of the invention.

Fig. 2 is a fragmentary plan view of a chain conveyer intersection with which a preferred embodiment of the invention is incorporated.

Fig. 3 is a fragmentary cross-sectional detail view taken on the line 3—3 of Fig. 2.

Fig. 4 is a vertical sectional view taken on the line 4—4 of Fig. 1.

Fig. 5 is a view similar to Fig. 4 illustrating another phase in the operation of the invention.

Fig. 6 is an enlarged detail view taken on the line 6—6 of Fig. 4 with a portion of the frame of one of the conveyers of said intersection broken away to reveal the operation of the control mechanism. In this view, the situation here illustrated is where there are no boxes in the intersection on the main conveyer but where a box is approaching the intersection on the feed conveyer.

Fig. 7 is a view similar to Fig. 6 and illustrating the situation which exists just following that illustrated in Fig. 6 where in the meantime a box enters the intersection on the main conveyer.

Fig. 8 is a view similar to Fig. 7 and illustrates the situation which immediately follows that shown in Fig. 7 when a box traveling on the feed conveyer engages and actuates a control element for stopping the feed conveyer.

Fig. 9 is a cross-sectional view taken on the line 7—7 of Fig. 8.

Referring specifically to the drawings, and particularly to the preferred embodiment of the invention illustrated in Figs. 1, and 4 to 9, inclusive, the invention is there seen to be incorporated in an intersection 10 formed between a primary conveyer 11 and a secondary conveyer 12.

The conveyer 11 includes side frame members 16 and 17 which are supported on legs 18 and which are provided with rail brackets 20 and 21. The frame members 16 and 17 are preferably formed of sheet metal rolled into channel form, as clearly shown in Fig. 6, to provide side walls 25, from which upper and lower walls 26 and 27 are bent, the walls 26 having flanges 28 bent downwardly from their inner edges. Mounted between the flanges 28 are a series of primary belt supporting rollers 29 and idle rollers 30 are rotatably supported between the side walls 25. Suitable end pulleys (not shown) are provided in the conveyer 11 for supporting opposite ends of and driving a conveyer belt 31, the upper flight of this belt resting on the rollers 29 and traveling continuously in the direction of the arrow 32, while the lower flight of this belt returns in the opposite direction while supported on the rollers 30.

As shown in Fig. 7, the belt 31 is suitable for supporting and conveying along the primary conveyer 11 a box B which is considerably wider than the belt. This box, in fact, extends outwardly over the side frame members 16 and 17.

Pivotally mounted on spacer shafts 35 supported by cap screws 36 on the frame members 16 and 17 is a series of box responsive levers 37 which extend upwardly through openings 38 in the upper walls 26 of the frame member 16 and have downwardly extending arms 40 which are linked together by links 41. There are three of these levers 37 which are spaced apart slightly less than the length of a box B and normally extend upwardly into the path of boxes on the conveyer 11.

The secondary conveyer 12 includes side frame members 42 and 43, the front ends of which preferably abut against and are secured to the side frame member 16 of the conveyer 11, as shown in Figs. 1 and 6. These side frame members 42 and 43 are supported on suitable legs (not shown) but which are similar to legs 18 of the conveyer 11 and are provided with guide rail brackets 44 and 45.

The side frame members 42 and 43 are identical in construction to the side frame members 16 and 17 previously described, and the same reference numerals will be used for the detail elements of the members 42 and 43 when referring to the same.

Rotatably mounted between the side frame members 42 is a pulley 48 and a power roller 49, the pulley 48 having sprockets 50 and 51. The roller 49 has a sprocket 52, the sprockets 52 and 50 being connected by a chain 53.

Mounted on the bottom walls 27 of the side frame members 42 and 43 is a geared motor power unit 54 having a sprocket 55 which is connected by a chain 56 to the sprocket 51, this chain passing through suitable openings 57 provided in the bottom wall 27 of the frame member 53.

Supported between the flanges 28 of the side frame members 42 and 43 are idle rollers 60 which support the upper flight of a conveyer belt 61 which is trained about and driven by the power unit 54 in the direction of the arrow 62 (see Fig. 6). The lower flight of the belt 61 is supported on suitable idle rollers (not shown) on the secondary conveyer 12, and returns to the opposite end of the conveyer where this belt is trained around an idle pulley (not shown).

Fixed at its opposite ends to the flanges 28 of the side frame members 42 and 43 close to the pulley 48 is a control member supporting shaft 63, this rotatably supporting a control member 64. This member has a hub 65, a cam arm 66, a stop 67 extending upwardly from the end of this arm, and a pair of ears 68 extending downwardly from the end of the arm. The hub 65 is centralized on the shaft 63 by collars 70.

Secured to bottom walls 27 of the frame members 42 and 43 is a plate 71 on which is mounted a switch 72 having an arm 73, on the end of which is a roller 74, this roller being located beneath the center of the conveyer 12. Fixed on the plate 71 directly above the roller 74 is a sleeve 75, in which vertically slides the stem 76 of a toggle base 77, this base having a stop finger 78.

Surrounding the sleeve 75 and yieldably urging the toggle base 77 upwardly, is a spring 80. Adjustably threaded onto the lower end of the stem 76 are lock nuts 81 which limit the upward movement of the toggle base 77 in response to the spring 80.

Pivoted between the ears 68 is a gimbal head 85 which is also pivotally connected to links 87 of a toggle 88. This toggle also includes a pair of links 89 which are pivotally connected to the toggle base 77 and have their other ends, as well as the lower ends of the links 87, pivotally connected to the head 90 of a spring rod 91.

The rod 91 slides in a trunnion block 92 and has lock nuts 93 on its lower end. Coiled about the rod 91 between the block 92 and the rod head 90 is an expansion spring 94.

The trunnion block 92 is pivotally mounted within a bifurcated arm 95 provided on a shaft 96 which is journalled in suitable bearings 97 fixed on the bottom of the plate 71. The opposite end of the shaft 96 has fixed thereto an arm 98 which is connected by a link 99 to the adjacent primary box responsive lever 37. (See Figs. 6 and 9.)

Supported on upper ends of the brackets 21 is a guide rail 110. Fixed on upper ends of the brackets 20 and the bracket 45 is a guide rail 111. Supported by the bracket 44 and pair of brackets 20 on the primary conveyer 11 is a guide rail 112. These guide rails are suitably shaped to guide boxes traveling along the primary conveyer 11 and assist with the transfer of boxes from the secondary conveyer 12 onto the primary conveyer 11.

The switch 72 is interposed in the circuit of the geared motor unit 54 so that when this switch is shut off by depressing the arm 73 the conveyer 12 is halted, and vice versa.

*Operation*

The conveyers which unite to form the intersection 10 are especially adapted for handling loaded boxes such as packed boxes of oranges and for purposes of illustration it is assumed that these conveyers are operated for this purpose. The control member 64 is adapted to be so operated by the levers 37 and the mechanism connecting these as to stop the secondary conveyer 12 whenever there is any danger of a box being discharged from the latter colliding with another box traveling on the primary conveyer 11. The manner in which this is done is as follows:

Whenever no box is on the conveyer 11 depressing one of the levers 37, these are free to swing upwardly as shown in Figs. 1, 4, and 6. This results in a rotation of the shaft 96 which pulls the rod 91 downwardly as shown in Fig. 4, thus collapsing the toggle 88, permitting the member 64 to drop downwardly entirely out of the path of boxes carried on the conveyer 12. (See Figs. 4 and 6.)

When the member 64 is thus depressed, it does not interfere in any way with the passage of boxes thereover. As each box travels from the conveyer belt 61 over the member 64 and onto the power driven roller 49 and the weight of the box commences to be picked up by this roller, this roller speeds up the travel of the box so as to cause a gap between it and the one following it and thus prevents any face-to-face jamming of the foremost box with the next box behind it as the foremost box is fed from the conveyer 12 into the intersection 10.

The face-to-face relation which is thus avoided has in the past been a cause for the jamming of boxes in conveyer intersections and is entirely eliminated in the present invention.

Whenever a box approaches the intersection 10 on the conveyer 12 at the same time a box approaches this intersection on the conveyer 11, so that the latter box engages one of the levers 37 before the first mentioned box comes opposite the control member 64, the invention operates as follows:

Upon the depression, as by box B on the primary conveyer 11 of the first of the levers 37, this rotates the shaft 96 and as shown in Fig. 5 swings the arm 95 upwardly, bringing the pressure of the spring 94 to bear against the rod head 90 on which the links in the toggle 88 are pivoted and thus tends to straighten out the toggle 88 into over-balanced condition as shown in Fig. 5 in which the center of the toggle bears against the stop finger 78. This straightening out of the toggle 88 lifts the control member 64 into its upwardmost position shown in Fig. 7 provided that at the time the shaft 96 is thus rotated a box being discharged from the secondary conveyer 12 is not disposed directly over this member.

If at the time of this rotation of the shaft 96 a box should be thus disposed it would hold the member 64 down substantially in the same position in which it is shown in Fig. 6, even though the spring 94 would be compressed and thus tend to straighten out the toggle 88 and lift the member 64. As soon as the box disposed above the member 64 has passed over this, the tension under which the spring 94 is held immediately snaps the toggle 88 into the position in which it is shown in Figs. 5 and 7 and lifts the member 64 into the path of an approaching box A being carried on the conveyer 12.

When the box A comes into contact with the member 64 with the latter thus positioned, it exercises a camming action on the member 64 so as to swing this downwardly, this motion being transmitted through the toggle 88 to the toggle base stem 76 and from this to the roller 74 and arm 73 of the switch 72, thereby shutting off the latter and halting the conveyer 12.

Figs. 8 and 9 show the situation which exists when box A on the conveyer 12 has cammed the member 64 downwardly sufficiently to shut off the switch 72 and stop the conveyer 12 from operating. There is a certain amount of coasting of this conveyer which takes place after the motor unit 54 is de-energized, and the stop 67 provided on the end of the cam arm 66 is for the purpose of causing the foremost box on the conveyer to halt in a given position when this conveyer is stopped. This assures uniform co-operation of the two conveyers and prevents jamming of the intersection 10.

As soon as box B passes over the third lever 37 adjacent to the apex of the guide rod 111 (see Fig. 1) all three of these levers are free to rock into their normal position as shown in Figs. 1 and 4, which pulls downwardly on the rod 91 and breaks the toggle 88, thus lowering the member 64 to the position in which it is shown in Fig. 6 and permitting the spring 80 to lift the toggle base 77 so as to release the arm 73 from pressure of the stem 76. The switch 72 is thus closed, starting the motor unit 54 and the conveyer 12 driven thereby.

The box A is thus delivered across the member 64 onto the roller 49 and then onto the conveyer 11 in the normal manner described hereinabove. The speeding up of this box as it travels over the roller 49 leaves a gap between it and the next box which provides adequate space in front of the latter, into which the member 64 may be lifted, provided another box traveling along the conveyer 11 should at that moment move into contact with the first of the levers 37.

The switch 72 is only shut off by the member 64, however, when the latter is engaged by a box on the conveyer 12 at a time when this member 64 is inclined upwardly as shown in Fig. 7. If a box should be traveling along the conveyer 12 so as to extend over the member 64 a sufficient distance to prevent the latter from being lifted up to this position by contact of a box on the conveyer 11 with the first lever 37, the toggle 88 cannot be extended and the pressure of the box on the member 64 will cause the spring 94 to be collapsed and the box will ride right over the member 64 and continue traveling through the intersection.

As the box which thus passes over the member 64 will be delivered onto the conveyer 11 in advance of the box which has just engaged the first member 37 as aforesaid, the latter box will remain in contact with one or the other of the members 37 after the first mentioned box has passed over the member 64 and freed this. Under the pressure of the spring 94 the toggle 88 will be immediately extended and the member 64 snapped upwardly into its uppermost operative position as shown in Figs. 5 and 7.

The positioning of the shaft 63 below the horizontal plane in which a box on the conveyer 12 engages the member 64 and the inclination given to the face of the stop 67 which is engaged by such a box, causes a contact between this box and the stop member 67 at a time when the toggle 88 is not extended to cam the member 64 further downwardly so that the box passes over the top of the stop 67.

As already mentioned, the foremost box delivered from the conveyer 12 onto the conveyer 11 is sped up when passing over the roller 49 so as to create a space between it and the next following box and this prevents a jam in the intersection which might otherwise occur as the result of the foremost box traveling into the intersection at the head of a series of boxes which are disposed in snug end-to-end contact. The operation of the conveyer control of the invention is also seen to stop any box which arrives at the end of the conveyer 12 in the position of box A in Fig. 7 during a period beginning with the contact by a box on the conveyer 11 with the first of the levers 37 and ending with the passage of this box on the conveyer 11 out of contact with the third of these levers.

The levers 37 are so located and spaced along the conveyer 11 that any box on the conveyer 12 which extends over the member 64 at the time a box traveling on the conveyer 12 comes into contact with the first lever 37, has ample time to travel from the conveyer 12 through the intersection and onto the conveyer 11 without interfering with this box on the conveyer 11. It is also clear that any box subsequently arriving at the end of the conveyer 12 while one or the other of the levers 37 is still depressed by a box on the conveyer 11 will actuate the member 64 so as to stop the conveyer 12 and halt the box causing this in the position of box A in Fig. 8.

It is likewise to be noted that where the conveyer 12 has been stopped by the depression of the levers 37 and the engagement with the member 64 of a box at the discharge end of the conveyer 12, the latter conveyer is started immediately when the levers 37 are freed to rise into the position in which they are shown in Fig. 4. This freeing of the levers 37 always occurs just as a box on the conveyer 11 passes from over the third of the levers 37. Owing to the fact that the leading box on the conveyer 12 at the time the latter is thus halted is always in a given position—that is, with the front end of the box against the stop 67—and as the only box on the conveyer 11 with which this first mentioned box may jam is at that moment always located at a given position on the conveyer 11, it is possible, with mathematical accuracy, to design the intersection 10 so that these two boxes can never jam with each other. The patent drawings illustrate, practically to scale, a commercial installation of the invention with the proper proportions to prevent jamming of the boxes. In this installation, the conveyer belt 31 preferably travels at one and one-half times the rate of the belt 61.

Another advantage of the conveyer control of the invention is that it is adapted to be employed with equal facility in an intersection between conveyers having belts such as the conveyors 11 and 12 and with an intersection between conveyers having chains, as shown in Figs. 2 and 3. These figures illustrate an intersection 120 between conveyers 121 and 122. The only difference between the intersection 120 and intersection 10 is that the conveyers 121 and 122 employ pairs of chains 123 and 124 respectively in place of belts for carrying the boxes. It is thus seen that the levers 37 may be installed in a side channel frame 125 of the conveyer 121 in the intersection 120 in exactly the same way as they are installed in the side frame member 16 of the conveyer 11. When thus installed, the levers 37 function in exactly the same manner in this intersection as they do in the intersection 10 and which has been described hereinabove.

What we claim is:

1. In combination: a conveyer for carrying boxes; a control member pivotally mounted on a horizontal axis and adapted to be swung upwardly into the path of said boxes adjacent the discharge end of said conveyer for rocking said member upwardly in the path of said boxes; toggle means responsive to the downward swinging of said control member, caused by engagement of a box therewith to stop said conveyer; and yieldable means for extending said toggle means to shift said control member upwardly as aforesaid, said yieldable means yielding when operated while a box is disposed over said member, so as to prevent the lifting of said member.

2. In a device for controlling movement of a box handling power conveyer, the combination of: power transmission means for operating said conveyer; means causing a free space in advance of a box carried on said conveyer; a control member adapted to be shifted into said space into a position to present an obliquely disposed cam surface to a front corner edge of said box so that continued movement of said box on said conveyer operates to cam said member outwardly from said space; means for shifting said member inwardly into said position; and means rendered operative by the camming outward of said member from said position to interrupt said transmission means and halt said conveyer, said last recited means being inoperative to halt said conveyer when the movement of said member toward said position is obstructed by its contacting a longitudinal face of a box, said halting means after having halted said conveyer being responsive to the relaxing of said member shifting means to start said conveyer.

3. A combination as in claim 2 in which a stop is provided on said member to come into play, after said member has been extended into the aforesaid position in said space and then cammed outwardly so as to interrupt said power transmission means, to engage a forward face of the box engaging said member to physically obstruct further forward movement of said box should said conveyer not yet have been completely halted.

4. A combination as in claim 2 in which a stop is provided on said member to come into play, after said member has been extended into the aforesaid position in said space and then cammed outwardly so as to interrupt said power transmission means, to engage a forward face of the box engaging said member to physically obstruct further forward movement of said box should said conveyer not yet have been completely halted, said stop having a cam face presented to said box so that in the event said shifting means should shift said member toward said position at a time when a box is disposed opposite said member and yet not entirely past said member so that the front end of said box engages said stop, said halting means will be inoperative to halt said conveyer and said stop when engaged by said box will be cammed out of the path of said box so as to permit the latter to continue on said conveyer.

5. A combination as in claim 2, in which said member shifting means includes a toggle and yieldable means for actuating said toggle to extend the latter and thereby shift said member into said space, and in which said transmission interrupting means is adapted to be actuated to stop said conveyer only by pressure transmitted from said member through said toggle when the latter is fully extended, said yieldable means yielding when said toggle is prevented from responding to said yieldable means by the contact of said member with a box.

GERALD C. PAXTON.
HOWARD L. PORCH.